Nov. 17, 1925.
U. T. WALKER
GENERATOR ATTACHMENT
Filed Jan. 22, 1925
1,562,395
2 Sheets-Sheet 1
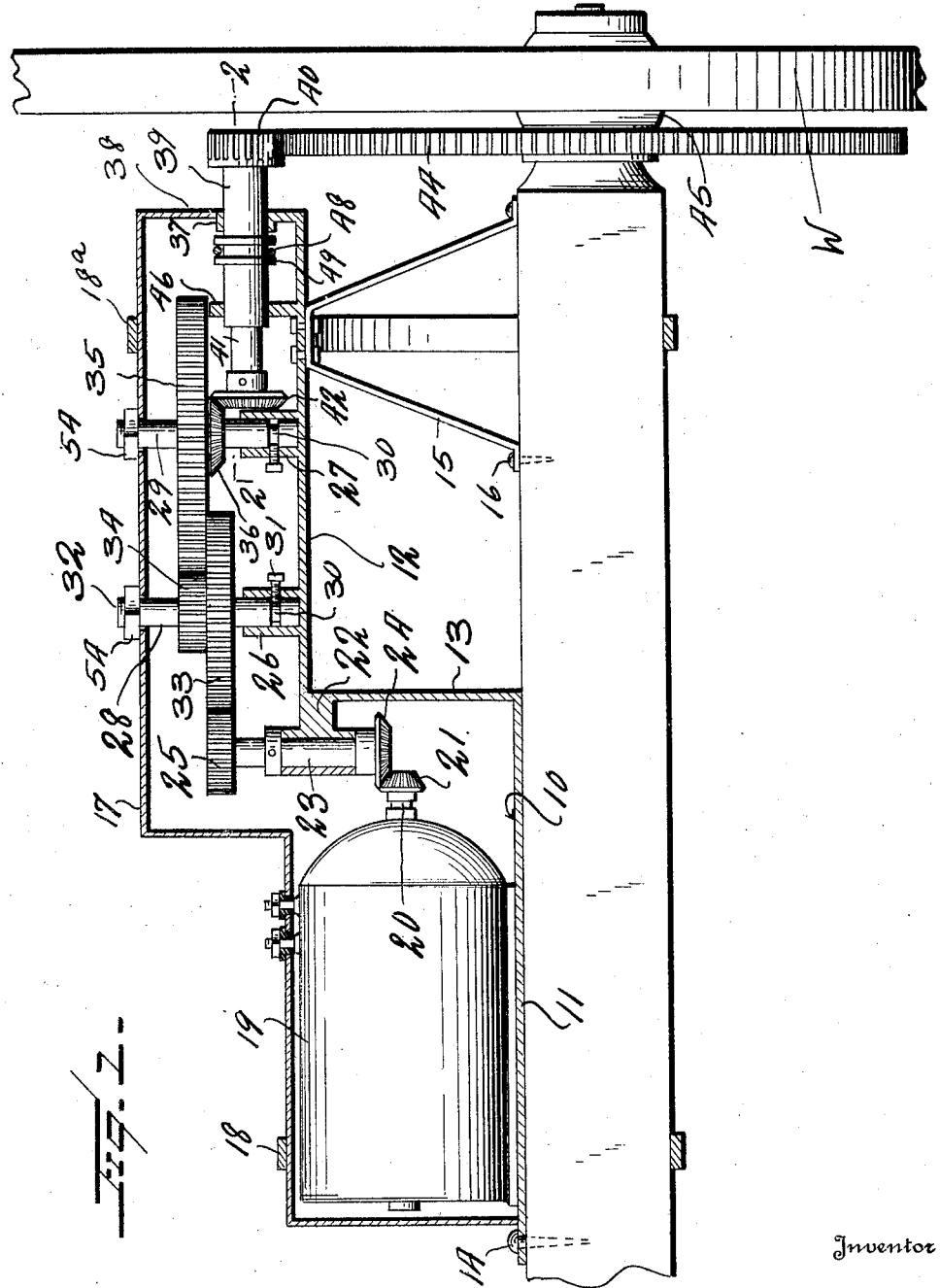
Inventor
U.T. Walker
By Watson E. Coleman
Attorney Nov. 17, 1925.  
U. T. WALKER  
1,562,395  
GENERATOR ATTACHMENT  
Filed Jan. 22, 1925 2 Sheets-Sheet 2
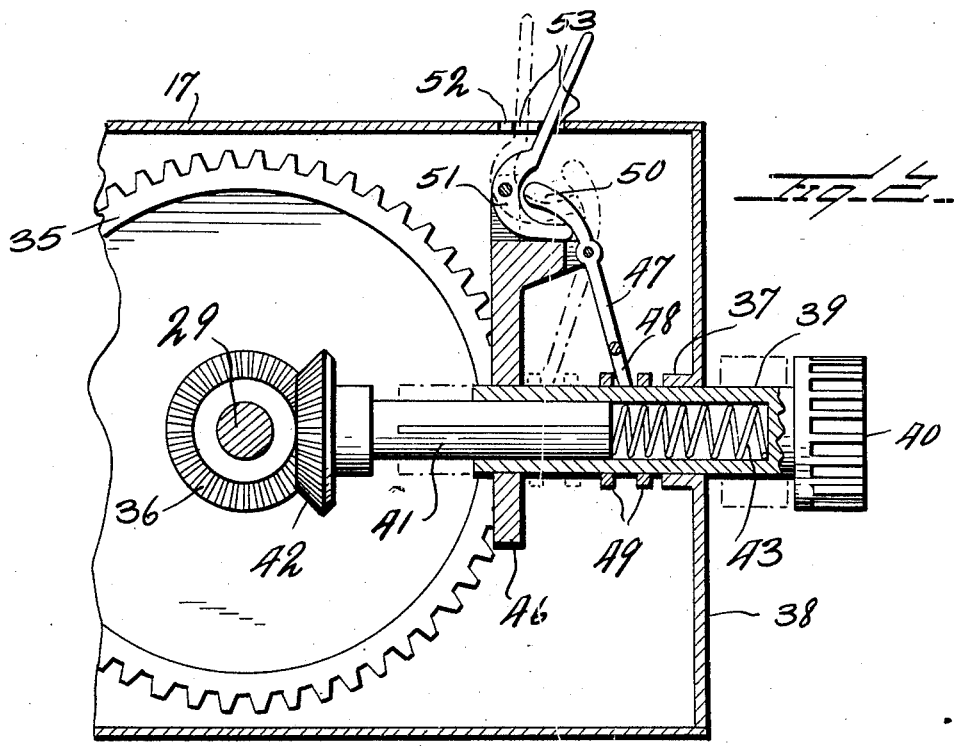
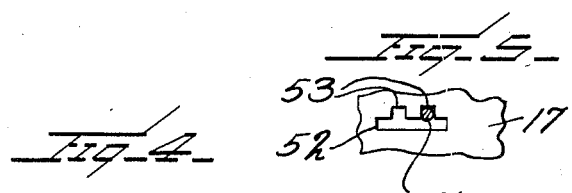
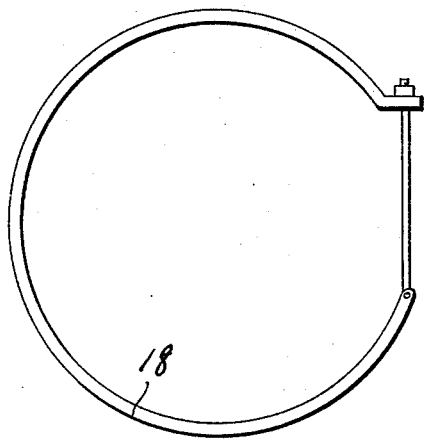
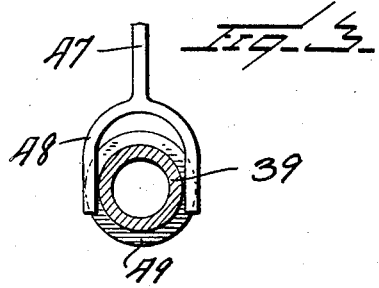
Inventor  
*U. T. Walker*  
By *Watson E. Coleman*  
Attorney Patented Nov. 17, 1925.

1,562,395

UNITED STATES PATENT OFFICE.

UEL T. WALKER, OF ECCLES, WEST VIRGINIA.

GENERATOR ATTACHMENT.

Application filed January 22, 1925. Serial No. 4,131.

*To all whom it may concern:*

Be it known that I, UEL T. WALKER, a citizen of the United States, residing at Eccles, in the county of Raleigh and State of West Virginia, have invented certain new and useful Improvements in Generator Attachments, of which the following is a specification, reference being had to the accompanying drawings.

This invention relates to generator attachments for wheeled vehicles and more particularly to an attachment for wagons whereby the rotation of the wheels thereof may be employed for operating a generator and supply current for signalling and lighting devices for the wagon.

An important object of the invention is to provide a device of this character which may be readily attached to the vehicle without in any manner altering the present construction thereof.

A further object of the invention is to provide a device of this character having means whereby the generator may be connected or disconnected from the drive as is found necessary.

A still further object of the invention is to provide a device of this character which may be cheaply and readily produced cheaply operated and which will be durable and efficient in service.

These and other objects I attain by the construction shown in the accompanying drawings, wherein for the purpose of illustration is shown a preferred embodiment of my invention and wherein:—

Figure 1 is a vertical sectional view through a generator attachment constructed in accordance with my invention and showing the same applied to a vehicle;

Figure 2 is an enlarged sectional view on the line 2—2 of Figure 1;

Figure 3 is a detailed sectional view showing the engagement of the shifting fork;

Figure 4 is a side elevation of the type of clamping band employed; and

Figure 5 is a detailed view showing the notches employed for holding the control element in adjusted positions.

Referring now more particularly to the drawings, the numeral 10 indicates a base having an axle engaging portion 11 and an offset portion 12 integrally connected with the axle engaging portion by a wall 13. The free end of the axle engaging portion has openings for the reception of securing elements 14 extending through the base and engaging in the axle of the vehicle. To the offset portion is secured a substantially V-shaped brace 15, the ends of the arms of which have openings for the reception of securing elements 16 for engagement with the vehicle. The base and a cover therefor, generally indicated at 17 are further secured to the axle by adjustable clamping bands 18 and 18ª, one of which embraces the structure adjacent each end thereof.

Secured to the section 11 of the base is a generator 19, the shaft 20 of which has secured thereto a pinion 21. The generator 19 may be of that type commonly employed in automobiles. Mounted in a bearing 22 secured to the connecting wall 13 of the base 10 is a shaft 23 having at one end a gear 24 meshing with the pinion 21 and at its opposite end a pinion 25. Secured to the section 12 of the base at points spaced longitudinal therealong are a pair of step bearings 26, 27 in which are engaged the inner ends of shafts 28 and 29, the shafts being held against longitudinal shifting in the bearings. In the present instance, the shafts are shown as provided with grooves 30 into which extend securing elements or set screws 31 directed through the bearings. Any other suitable means for preventing longitudinal movement of the shafts in the bearings may be adopted if so desired. The outer ends of these shafts are threaded, as indicated at 32, for a purpose presently to appear.

The shaft 28 has a gear 33 meshing with the pinion 25 and a pinion 34 secured thereto while the shaft 29 has a gear 35 meshing with the pinion 34 and a pinion 36 secured thereto. Slidably and rotatably mounted in a bearing 37 carried by the end wall 38 of the cover 17 adjacent the shaft 29 is a hollow shaft 39, the outer end of which has secured thereto a pinion 40. Slidably mounted in the interior of the inner end of the shaft 39 and splined thereto is a shaft 41, the inner end of which has a gear 42 engaging the pinion 36. The outer end of the shaft 39 is closed and between this outer end and the adjacent end of the shaft 40, a spring 43 is located tending to separate the shaft section and force the shaft 41 inwardly and the shaft 39 outwardly. The pinion 40 is adapted to coact with a ring gear 44 secured to the wheel W of the axle and to be held in engagement therewith by the spring 43. In the present instance, the gear 44 is shown as attached to the hub 45 of the wheel.

Secured to a standard 46 carried by the base section 12 is a pivoted shifting lever 47, one end of which is in the form of a fork 48 engaging between collars 49 secured to the shaft 39 and the opposite end of which has an angular portion 50, the purpose of which will presently appear. Through the action of the spring, the shaft 39 is urged outwardly and this angular end portion inwardly toward the adjacent portion of the standard 46. Pivoted to this end of the standard 46 is a bent lever 51 one arm of which coacts with the angular portion 50 and the opposite arm of which extends through an opening 52 formed in the cover and coacts with notches 53 at one side of the opening so that it may be held in either of two positions. In one of these positions, the bent portion 25 of the shifting fork is disengaged and the spring 43 is free to act to urge the shaft 39 outwardly so that the gear 44 and pinion 40 are engaged. In the other of these positions, the bent portion 50 is engaged by the bent lever 51 and forced outwardly with the result that the lower end thereof moves inwardly shifting the shaft 39 inwardly to disengage the pinion 40 and the gear 44. The cover 17 is held in position by the bands 18 above referred to and by nuts 54 engaged with the threaded outer ends 32 of the shafts 28 and 29. These shafts are passed through openings formed in the casing cover and the nuts abut the outer surface of the casing.

It will be obvious that the structure hereinbefore set forth is capable of a considerable range of change and modification without in any manner departing from the spirit of my invention and I accordingly do not limit myself to such specific structure except as hereinafter claimed.

I claim:

1. A generator attachment for the axles of vehicles including a base having an axle engaging portion and an offset portion connecting with the axle engaging portion by an integral wall, a generator supported from said axle engaging portion, a cover for the base, a shaft rotatably supported by the cover, a gear train for connecting said shaft, and the generator shaft, carried by the base and including shafts projecting through said cover and means mounted on said shafts for maintaining the cover in position upon the base.

2. A generator attachment for the axles of vehicles including a base having an axle engaging portion and an offset portion connecting with the axle engaging portion by an integral wall, a generator supported from said axle engaging portion, a cover for the base, a shaft rotatably supported by the cover, a gear train for connecting said shaft, and the generator shaft carried by the base and including shafts projecting through said cover, means mounted on said shafts for maintaining the cover in position upon the base, a brace secured to the offset portion and embodying arms having their ends arranged in the same plane as the axle engaging portion and bands for encircling an axle and said casing and base for clamping the same to an axle.

3. In combination with a rotating element and a generator in fixed relation to said rotating element, a gear train connecting the rotating element with the shaft of the generator including a gear carried by the rotating element and a shaft formed in two sections, one provided with a gear for engagement with a gear of the gear train and the other provided with a gear for engagement with the gear of said rotating element, means for preventing relative rotation of the sections of the shaft, a spring tending to separate the sections of the shaft and urging the gear of the last named section into engagement with the gear of the rotating element, means for shifting the last named section to disengage the gear thereof from the gear of the rotating element and for locking said last named section in adjusted positions, including a support of said gear train, a standard carried thereby, a bent lever pivoted upon the standard, a shifting fork likewise pivoted upon the standard and engaging the last named shaft section and an angular end portion upon said shifting fork with which one end of the bent lever coacts.

4. In combination with a rotating element and a generator in fixed relation to said rotating element, a gear train connecting the rotating element with the shaft of the generator including a gear carried by the rotating element and a shaft formed in two sections, one provided with a gear for engagement with a gear of the gear train and the other provided with a gear for engagement with the gear of said rotating element, means for preventing relative rotation of the sections of the shaft, a spring tending to separate the sections of the shaft and urging the gear of the last named section into engagement with the gear of the rotating element, means for shifting the last named section to disengage the gear thereof from the gear of the rotating element and for locking said last named section in adjusted positions, including a standard stationary with respect to said shaft sections, a bent lever pivoted upon the standard, a shifting fork pivoted intermediate its ends to said standard and having a fork engaging the last named shaft section at one end and at its opposite end an angular portion adjacent one end of the bent lever, the spring acting upon the last named shaft section moving the shifting fork about the pivot thereof in a direction shifting said angular portion toward the adjacent end of the bent lever.

5. In combination with a rotating element and a generator in fixed relation to said rotating element, a gear train connecting the rotating element with the shaft of the generator including a gear carried by the rotating element and a shaft formed in two sections, one provided with a gear for engagement with a gear of the gear train and the other provided with a gear for engagement with the gear of said rotating element, means for preventing relative rotation of the sections of the shaft, a spring tending to separate the sections of the shaft and urging the gear of the last named section into engagement with the gear of the rotating element, means for shifting the last named section to disengage the gear thereof from the gear of the rotating element and for locking said last named section in adjusted positions, including a standard stationary with respect to said shaft section, a bent lever pivoted upon the standard, a shifting fork pivoted intermediate its ends to said standard and having a fork engaging the last named shaft section at one end and at its opposite end an angular portion extending adjacent one end of the bent lever, the spring acting upon the last named shaft section moving the shifting fork about the pivot thereof in a direction shifting said angular portion toward the adjacent end of the bent lever, and means for locking the bent lever in adjusted positions.

In testimony whereof I hereunto affix my signature.

UEL T. WALKER.